(12) United States Patent
Lee et al.

(10) Patent No.: US 10,981,604 B2
(45) Date of Patent: Apr. 20, 2021

(54) VEHICLE BULKHEAD STRUCTURE

(71) Applicants: HYUNDAI MOTOR COMPANY, Seoul (KR); KIA MOTORS CORPORATION, Seoul (KR)

(72) Inventors: Sun Ju Lee, Incheon (KR); Hyun Sik Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 77 days.

(21) Appl. No.: 16/594,627

(22) Filed: Oct. 7, 2019

(65) Prior Publication Data

US 2020/0247477 A1 Aug. 6, 2020

(30) Foreign Application Priority Data

Feb. 1, 2019 (KR) .................. 10-2019-0013935

(51) Int. Cl.
*B62D 25/14* (2006.01)
*B62D 33/06* (2006.01)
*B62D 27/02* (2006.01)
*B62D 25/08* (2006.01)

(52) U.S. Cl.
CPC ........... *B62D 25/14* (2013.01); *B62D 25/082* (2013.01); *B62D 27/02* (2013.01); *B62D 33/0604* (2013.01)

(58) Field of Classification Search
CPC .... B62D 25/14; B62D 33/0604; B62D 27/02; B62D 25/082; B62D 25/2018; B62D 25/2045; B60R 13/0838; B60R 13/08

USPC ............................................ 296/192, 203.02
See application file for complete search history.

(56) References Cited

U.S. PATENT DOCUMENTS

| 6,361,102 | B1* | 3/2002 | Han | B62D 25/2045 |
| | | | | 296/203.02 |
| 8,388,048 | B2 | 3/2013 | Usuda | |
| 8,702,148 | B2 | 4/2014 | Ichikawa | |
| 9,821,851 | B1* | 11/2017 | Kim | B62D 25/2018 |
| 2007/0151793 | A1* | 7/2007 | Plavetich | B62D 25/082 |
| | | | | 180/311 |
| 2011/0272970 | A1* | 11/2011 | Usuda | B62D 25/082 |
| | | | | 296/193.09 |
| 2013/0088048 | A1 | 4/2013 | Ichikawa | |
| 2016/0368535 | A1* | 12/2016 | Kim | B62D 29/008 |
| 2019/0106152 | A1* | 4/2019 | Choi | B62D 25/088 |
| 2020/0001929 | A1* | 1/2020 | Ohba | B62D 25/2045 |
| 2020/0086920 | A1* | 3/2020 | Okamoto | B62D 21/11 |
| 2020/0148146 | A1* | 5/2020 | Chung | B60R 19/18 |

FOREIGN PATENT DOCUMENTS

| JP | 5560329 B2 | 7/2017 |
| KR | 10-2003-0032139 A | 4/2003 |
| KR | 10-2010-0060286 A | 6/2010 |
| KR | 10-2017-0064426 A | 9/2017 |

* cited by examiner

*Primary Examiner* — Pinel E Romain
(74) *Attorney, Agent, or Firm* — Morgan, Lewis & Bockius LLP

(57) ABSTRACT

A vehicle bulkhead structure may include a dash panel; a pair of front side members spaced apart from each other and coupled to the dash panel; and a plurality of reinforcement members coupled to a front surface of the dash panel, wherein some of the plurality of reinforcement members support each front side member.

17 Claims, 4 Drawing Sheets

VEHICLE BULKHEAD STRUCTURE

CROSS-REFERENCE TO RELATED APPLICATION

The present application claims priority to Korean Patent Application No. 10-2019-0013935, filed on Feb. 1, 2019, in the Korean Intellectual Property Office, the entire contents of which is incorporated herein for all purposes by this reference.

BACKGROUND OF THE INVENTION

Field of the Invention

The present invention relates to a vehicle bulkhead structure, and more particularly, to a vehicle bulkhead structure which satisfies required strength and stiffness for each section of a dash panel efficiently, improving stiffness, crashworthiness, and noise, vibration, and harshness (NVH) performance.

Description of Related art

An engine compartment is provided at the front of a vehicle, and various parts such as an engine, a coolant tank, various oil tanks, a radiator, a battery, a junction box, an engine start motor, and a brake booster are mounted in the engine compartment.

The vehicle has a bulkhead structure that separates the engine compartment and an occupant compartment, and the bulkhead structure includes a dash panel for dividing the engine compartment and the occupant compartment. A pair of front side members and a dash crossmember are coupled to the dash panel to distribute the impact energy generated in the event of a vehicle collision.

The dash crossmember may extend in a width direction of the vehicle, and be coupled to a front surface of the dash panel. The pair of front side members may be coupled to the dash crossmember, and the dash crossmember may be configured to distribute the impact energy transmitted through the front side members while securing the lateral stiffness of the dash panel and the overall dynamic stiffness of the vehicle. The dash crossmember, which is a member for securing stiffness and crashworthiness, may be made of a hot stamping material.

The dash crossmember includes a plurality of reinforcement members which are coupled by welding and/or the like to portions required to be reinforced. The plurality of reinforcement members may have different materials and thicknesses to satisfy the required stiffness and strength.

In a conventional bulkhead structure, the dash crossmember is mounted with the reinforcement members having different materials and thicknesses at various portions thereof, increasing the weight and manufacturing cost of the vehicle body, and the number of components.

Furthermore, disadvantages of the conventional bulkhead structure include: the dash crossmember may fail to securely support the front side members, the dynamic stiffness (longitudinal bending, transverse bending, etc.) of the vehicle body may be weakened, and a joint of the front side member and the dash crossmember may be easily broken or deformed in the event of a vehicle collision.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle bulkhead structure which satisfies required strength and stiffness of a dash panel efficiently, improving stiffness, crashworthiness, and noise, vibration, and harshness (NVH) performance.

According to various aspects of the present invention, a vehicle bulkhead structure may include: a dash panel; a pair of front side members spaced apart from each other and coupled to the dash panel; and a plurality of reinforcement members coupled to a front surface of the dash panel, wherein some of the plurality of reinforcement members may support each front side member.

A rear end portion of the front side member may be coupled to the dash panel, and some of the reinforcement members may be coupled to both side surfaces of the front side member so that the rear end portion of the front side member may be supported by some of the reinforcement members.

The plurality of reinforcement members may include a stiffness member mounted on a stiffness area, and a strength member mounted on a strength area. The stiffness area may be a portion of the dash panel where stiffness is required, and the strength area may be a portion of the dash panel where strength is required.

The stiffness area may correspond to a center portion of the dash panel, and the strength area may correspond to both side portions of the dash panel.

The stiffness area may be an area located between the pair of front side members, and the strength area may be an area located between each front side member and a side edge portion of the dash panel.

The plurality of reinforcement members may include a first stiffness member mounted on a center portion of the stiffness area, a pair of second stiffness members mounted on both side portions of the first stiffness member, and a pair of strength members adjacent to outboard side end surfaces of the pair of second stiffness members, respectively.

The rear end portion of each front side member may be located between an adjacent second stiffness member and an adjacent strength member, and an end portion of the second stiffness member and an end portion of the strength member may be coupled to both side surfaces of the rear end portion of the front side member.

A cross-sectional area of the second stiffness member and a cross-sectional area of the strength member may gradually increase toward the front side member.

The first and second stiffness members may include the same material and have the same thickness.

The first and second stiffness members may include different materials and have different thicknesses.

The vehicle bulkhead structure may further include a dash crossmember coupled to a rear surface of the dash panel.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
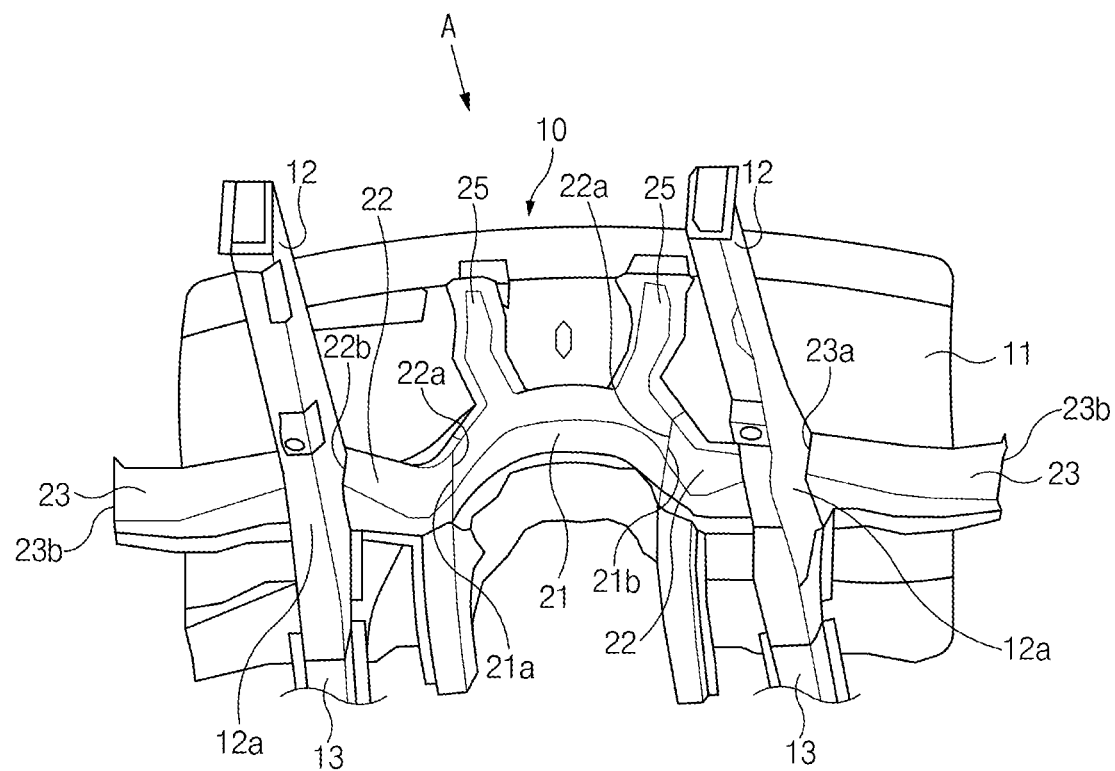
FIG. 1 illustrates a perspective view of a vehicle bulkhead structure according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In the drawings, the same reference numerals will be used throughout to designate the same or equivalent elements. Furthermore, a detailed description of well-known techniques associated with the present invention will be ruled out in order not to unnecessarily obscure the gist of the present invention.

Terms such as first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those understood by those with ordinary knowledge in the field of art to which an exemplary embodiment of the present invention belongs. Such terms as those defined in a generally-used dictionary are to be interpreted as having meanings equal to the contextual meanings in the relevant field of art, and are not to be interpreted as having ideal or excessively formal meanings unless clearly defined as having such in the present application.

Figure 2:
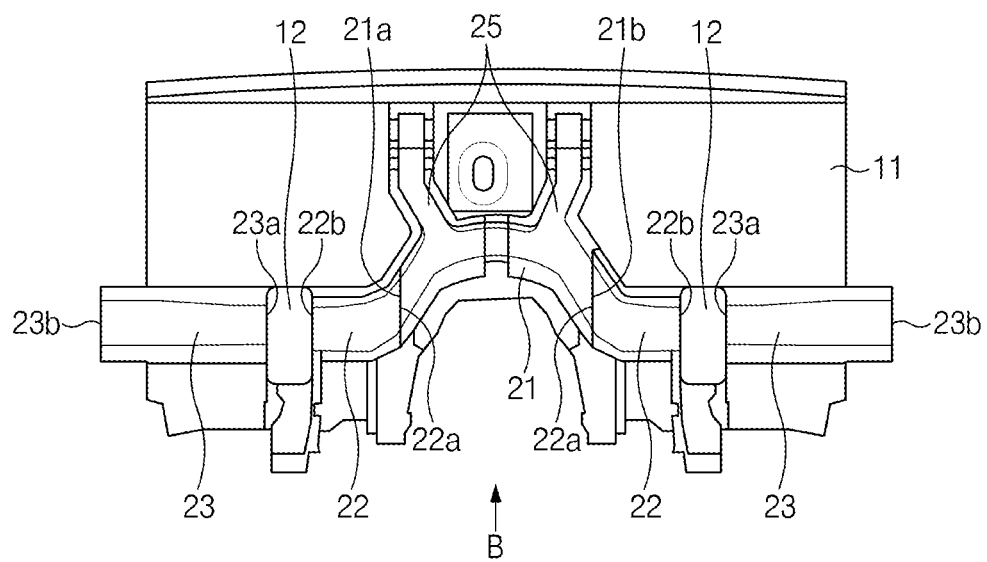
FIG. 2 illustrates a view in a direction of arrow one of FIG. 1.
Figure 3:
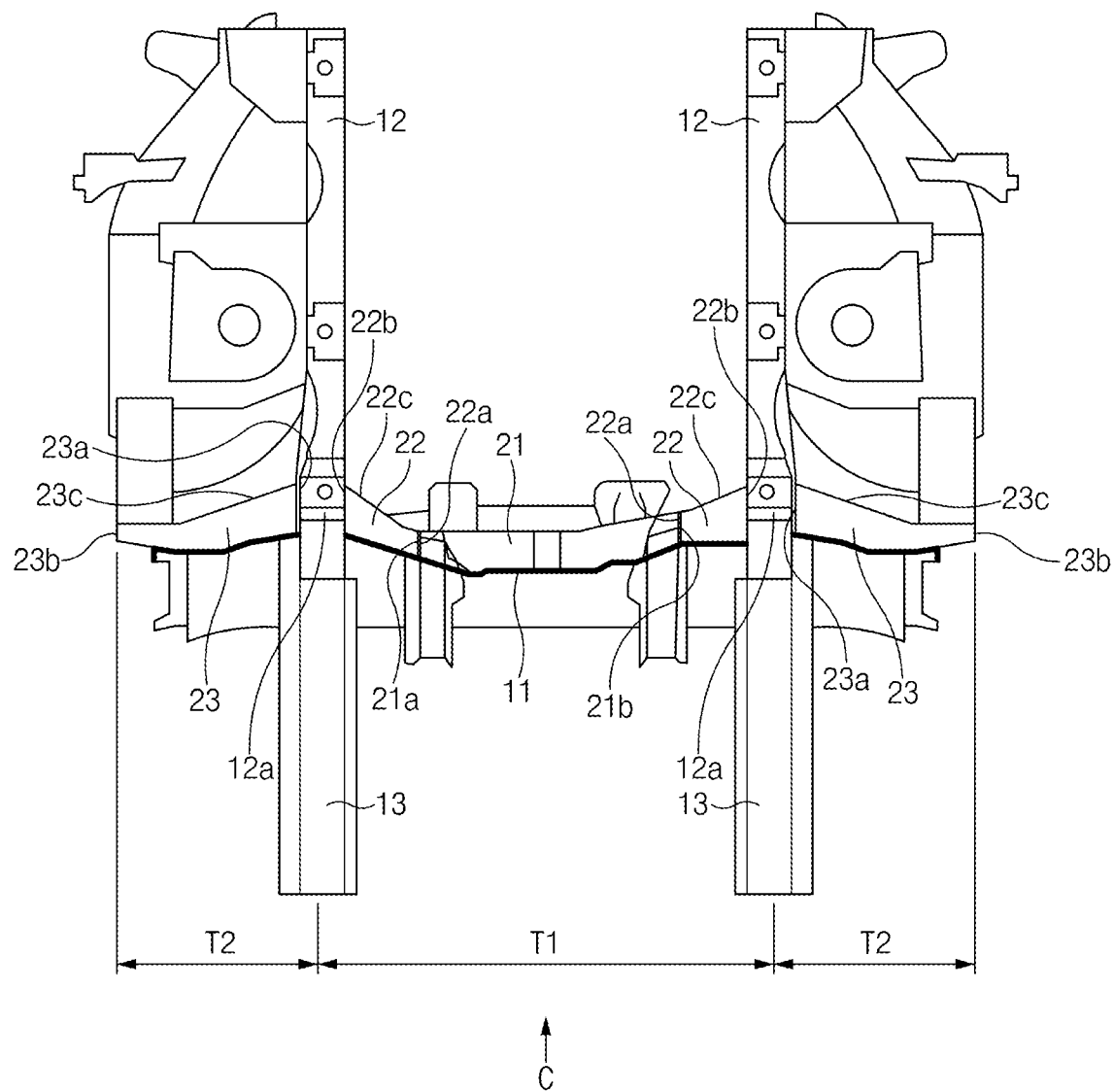
FIG. 3 illustrates a view in a direction of arrow B of FIG. 2.

Referring to FIG. 1, FIG. 2, and FIG. 3, a vehicle bulkhead structure 10 according to an exemplary embodiment of the present invention may include a dash panel 11 separating an engine compartment and an occupant compartment, a pair of front side members 12 connected to the dash panel 11, and a plurality of reinforcement members 21, 22, and 23 coupled to a front surface of the dash panel 11.

The vehicle bulkhead structure 10 may be configured to separate the engine compartment and the occupant compartment at the front of the vehicle. The dash panel 11 may be mounted between the engine compartment and the occupant compartment so that it may divide the engine compartment and the occupant compartment.

The pair of front side members 12 may be spaced from each other in a width direction of the vehicle, and each front side member 12 may extend in a longitudinal direction of the vehicle. A rear end portion 12a of the front side member 12 may be coupled to a lower portion of the dash panel 11, and a rear extension portion 13 may extend from the rear end portion 12a of the front side member 12 toward the rear of the dash panel 11. A bumper back beam or the like may be connected to a front end portion of the front side member 12.

The plurality of reinforcement members 21, 22, and 23 may be coupled to a front surface of the dash panel 11 by welding or the like, reinforcing the strength and stiffness of the dash panel 11.

At least some reinforcement members 22 and 23 of the plurality of reinforcement members 21, 22, and 23 may be coupled to both side surfaces of each front side member 12 by welding, using fasteners, and/or the like. Thus, each front side member 12 may be supported by the reinforcement members 22 and 23. A cross-section of each of the reinforcement members 22 and 23 may gradually increase toward the front side member 12 so that the rear end portion 12a of the front side member 12 may be securely supported and be securely coupled to the dash panel 11.

The plurality of reinforcement members 21, 22, and 23 may include stiffness members 21 and 22 mounted on portions of the vehicle body and/or the dash panel 11 where stiffness is required, and strength members 23 mounted on portions of the vehicle body and/or the dash panel 11 where strength is required.

The stiffness members 21 and 22 may have a material and a thickness configured for reinforcing the stiffness of the vehicle body and/or the dash panel 11.

A portion of the dash panel 11 where stiffness is required (hereinafter referred to as a stiffness area T1) may be an area T1 located between the pair of front side members 12. That is, the stiffness area T1 may correspond to a center portion of the dash panel 11. The stiffness members 21 and 22 may be attached to the stiffness area T1 so that the stiffness of the center portion of the dash panel 11 located between the front side members 12 may be reinforced.

Since the stiffness area T1 has a major effect on noise, vibration, and harshness (NVH) performance, the stiffness members 21 and 22 may have an optimized material and thickness to meet the noise, vibration, and harshness (NVH) performance and stiffness. Thus, the bulk (volume) or shape deformation of the dash panel 11 may be prevented when a load is applied to the stiffness area T1. For example, the stiffness of a bulkhead structure according to the related art is reinforced by adding reinforcement members having a thickness of 1 mm or more to a main member having a thickness of approximately 1 mm, while the stiffness members 21 and 22 according to an exemplary embodiment of the present invention have a thickness of 1.5 mm or more.

According to an exemplary embodiment of the present invention, the stiffness members 21 and 22 may include a first stiffness member 21, and a pair of second stiffness members 22 connected to both sides of the first stiffness member 21. The first stiffness member 21 may have an arc shape, and a center portion of the first stiffness member 21 may be curved toward an upper end portion of the dash panel 11. The pair of second stiffness members 22 may be symmetrically connected to a left side portion and a right side portion of the first stiffness member 21, and the second stiffness members 22 may be mounted adjacent to the front side members 12, respectively.

The first stiffness member 21 may be mounted at a portion (center portion) of the dash panel 11 adjacent to a center line of the dash panel 11, and the first stiffness member 21 may have a pair of first extension portions 25. Each first extension portion 25 may extend upwardly from the first stiffness member 21 along the dash panel 11, and the pair of first extension portions 25 may be laterally symmetrical with respect to a center line of the first stiffness member 21. The pair of first extension portions 25 may be coupled to the dash panel 11 by welding, using fasteners, and/or the like. In the present manner, the first stiffness member 21 may be attached to the center portion of the dash panel 11, significantly improving the stiffness of the center portion of the dash panel 11.

For example, the first and second stiffness members 21 and 22 may be made of the same material. Alternatively, the first stiffness member 21 may be made of a material different from that of the second stiffness member 22.

For example, a thickness of the second stiffness member 22 may be the same as that of the first stiffness member 21. Alternatively, the thickness of the second stiffness member 22 may be greater than that of the first stiffness member 21.

The strength member 23 may have a material and a thickness configured for reinforcing the strength of the vehicle body and/or the dash panel 11. According to an exemplary embodiment of the present invention, the pair of strength members 23 may be connected to the pair of second stiffness members 22, respectively.

A portion of the dash panel 11 where strength (or crashworthiness) is required (hereinafter referred to as a strength area T2) may be an area T2 located between each front side member and a side edge portion of the dash panel 11, and the strength area T2 may correspond to both side portions of the dash panel 11. That is, the pair of strength areas T2 may be located on both left and right sides of the stiffness area T1. The strength members 23 may be attached to the strength areas T2, respectively, reinforcing the strength of the left and right sides portions of the vehicle body and/or the dash panel 11. The strength member 23 may have an optimized material and thickness to meet the strength of the vehicle body. For example, the strength member 23 may be made of an (ultra) high-strength steel material so that the strength member 23 may prevent the deformation of an internal space and protect occupants.

Referring to FIG. 1, FIG. 2, and FIG. 3, the rear end portion 12a of each front side member 12 may be located between the adjacent second stiffness member 22 and the adjacent strength member 23. According to an exemplary embodiment of the present invention, an end portion of the second stiffness member 22 and an end portion of the strength member 23 may be individually coupled to both side surfaces of the rear end portion of the front side member 12 by welding. According to another exemplary embodiment of the present invention, the end portion of the second stiffness member 22 and the end portion of the strength member 23 may be individually coupled to both side surfaces of the rear end portion of the front side member 12 by a mechanical coupling method using fasteners or the like.

A cross-sectional area of the second stiffness member 22 and a cross-sectional area of the strength member 23 may gradually increase toward the front side member 12. That is, the second stiffness member 22 and the strength member 23 may have tapered surfaces 22c and 23c, respectively, which are inclined toward the front side member 12. Thus, the end portion of the second stiffness member 22 and the end portion of the strength member 23 may be more securely coupled to both side surfaces of the front side member 12.

As illustrated in FIG. 1, FIG. 2, and FIG. 3, the first stiffness member 21 may have a pair of end surfaces 21a and 21b formed on both left and right end portions thereof. Each second stiffness member 22 may have an inboard side end surface 22a and an outboard side end surface 22b. The inboard side end surface 22a of the second stiffness member 22 may be an end surface facing toward the center portion of the vehicle, and the outboard side end surface 22b of the second stiffness member 22 may be an end surface facing toward the outside of the vehicle. A right end surface 21a of the first stiffness member 21 may be coupled to the inboard side end surface 22a of the second stiffness member 22 located on the right of vehicle body by welding, using fasteners, and/or the like. A left end surface 21b of the first stiffness member 21 may be coupled to the inboard side end surface 22a of the second stiffness member 22 located on the left of the vehicle body by welding, using fasteners, and/or the like.

As illustrated in FIG. 1, FIG. 2, and FIG. 3, the strength member 23 may have an inboard side end surface 23a and an outboard side end surface 23b. The inboard side end surface 23a of the strength member 23 may be an end surface facing toward the center portion of the vehicle body, and the outboard side end surface 23b of the strength member 23 may be an end surface facing toward the outside of the vehicle body.

As illustrated in FIG. 3, the outboard side end surface 22b of the second stiffness member 22 and the inboard side end surface 23a of the strength member 23 located on the left of the vehicle body may be coupled to both side surfaces of the rear end portion 12a of the front side member 12 located on the left of the vehicle body by welding, using fasteners, and/or the like, respectively, and the outboard side end surface 22b of the second stiffness member 22 and the inboard side end surface 23a of the strength member 23 located on the right of the vehicle body may be coupled to both side surfaces of the rear end portion 12a of the front side member 12 located on the right of the vehicle body by welding, using fasteners, and/or the like, respectively.

According to the above-described exemplary embodiments of the present invention, the stiffness members 21 and 22 may reinforce the stiffness with respect to the stiffness area T1 which is located on the center portion of the vehicle, improving the dynamic stiffness (longitudinal bending, transverse bending, etc.) of the vehicle body. The strength members 23 may reinforce the strength with respect to the pair of strength areas T2 which are located on both side portions of the vehicle, preventing the deformation of the occupant compartment and protecting the occupants safely. The stiffness members 21 and 22 and the strength members 23 may be mounted to correspond to the stiffness area T1 and the strength areas T2 so that impact energy transmitted through the front side members may be effectively distributed, and the stiffness of the dash panel, the overall dynamic stiffness and strength of the vehicle may be sufficiently secured.

Meanwhile, by dividing sections of the dash panel into the stiffness area and the strength area, and individually setting materials and thicknesses suitable for required performance, the weight and cost of the vehicle body may be reduced, and the number of components may be reduced.

According to exemplary embodiments of the present invention, the end portion of the second stiffness member 22 and the end portion of the strength member 23 may securely support the front side member 12 so that the dynamic stiffness (longitudinal bending, transverse bending, etc.) of the vehicle body may be increased, and a joint of the front side member and a dash crossmember may be prevented from being easily broken or deformed in the event of a vehicle collision.

Figure 4:
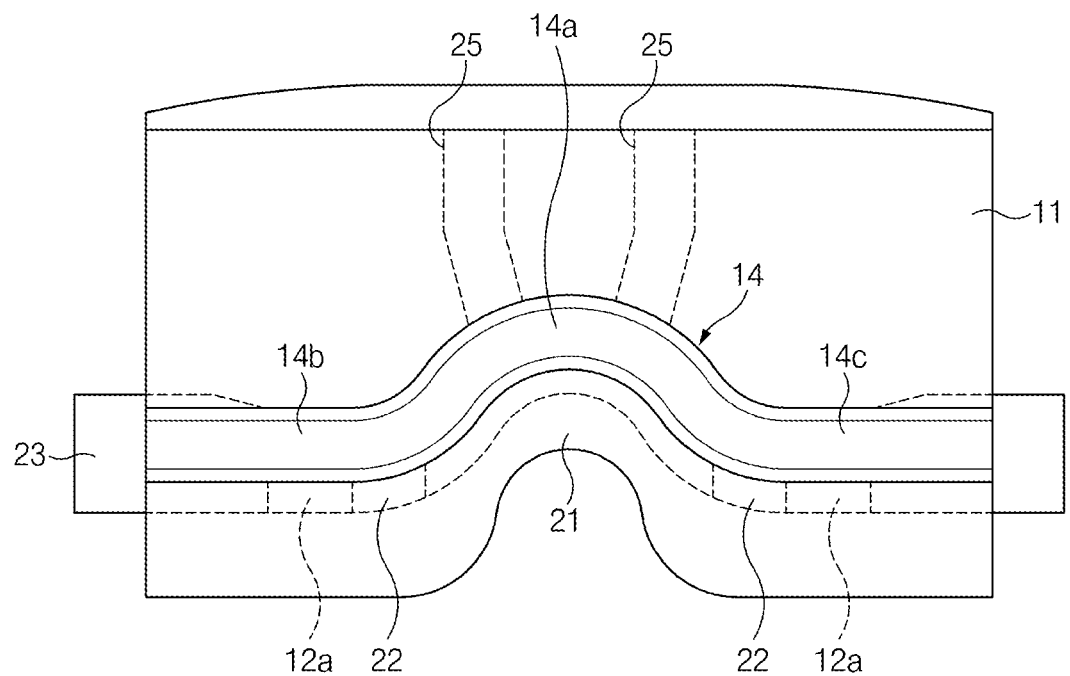
FIG. 4 illustrates a view in a direction of arrow C of FIG. 3.

Referring to FIG. 4, the vehicle bulkhead structure 10 according to an exemplary embodiment of the present invention may further include a dash crossmember 14 coupled to a rear surface of the dash panel 11 by welding, using fasteners, and/or the like. The dash crossmember 14 may have a shape corresponding to (or similar to) the coupled structure (or connected structure) of the first stiffness member 21, the second stiffness members 22, and the strength members 23. For example, the dash crossmember 14 includes a curved portion 14a and a pair of second extension portions 14b extending from the curved portion 14a to toward the outside of the vehicle, the pair of second extension portions 14b is aligned symmetrical with respect to a center line of the dash crossmember 14. The curved portion 14a has a shape corresponding to (or similar to) a shape of the first stiffness member 21, each second extending portion 14b has a shape corresponding to (or similar to) a coupled structure (or connected structure) of the second stiffness members 22 and the corresponding strength member 23. The dash crossmember 14 may be coupled to the rear surface of the dash panel 11 by welding, using fasteners, and/or the like, reinforcing the strength and stiffness of the dash panel 11.

As set forth above, the bulkhead structure according to exemplary embodiments of the present invention may satisfy required strength and stiffness of the dash panel efficiently, improving the dynamic stiffness of the vehicle body, and effectively distributing the impact energy transmitted through the front side members.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle bulkhead structure comprising:
   a dash panel;
   a pair of front side members spaced apart from each other and coupled to the dash panel; and
   a plurality of reinforcement members coupled to a front surface of the dash panel,
   wherein a predetermined number of the plurality of reinforcement members support each front side member.

2. The vehicle bulkhead structure according to claim 1, wherein a rear end portion of each front side member is coupled to the dash panel, and
   wherein the predetermined number of the reinforcement members is coupled to first and second side surfaces of each front side member so that the rear end portion of each front side member is supported by the predetermined number of the reinforcement members.

3. The vehicle bulkhead structure according to claim 2, wherein the plurality of reinforcement members include a first stiffness member mounted on a stiffness area of the dash panel, and a second strength member mounted on a strength area of the dash panel,
   wherein the stiffness area is a portion of the dash panel where a predetermined stiffness is required, and
   wherein the strength area is a portion of the dash panel where a predetermined strength is required.

4. The vehicle bulkhead structure according to claim 3, wherein the stiffness area corresponds to a center portion of the dash panel, and
   wherein the strength area corresponds to a first side portion and a second side portion of the dash panel.

5. The vehicle bulkhead structure according to claim 3, wherein the stiffness area is an area located between the pair of front side members, and
   wherein the strength area is an area located between each front side member and a side edge portion of the dash panel outside the stiffness area.

6. The vehicle bulkhead structure according to claim 5, wherein the second stiffness member of the plurality of reinforcement members is formed of a pair of second stiffness members, each of the second stiffness members mounted on the first stiffness member, and
   wherein the plurality of reinforcement members further includes a pair of third strength members, each of the third strength members being adjacent to outboard side end surfaces of the pair of second stiffness members, respectively.

7. The vehicle bulkhead structure according to claim 6, wherein the rear end portion of each front side member is located between an adjacent second stiffness member of the pair of the second stiffness members and an adjacent third strength member of the third strength members, and
   wherein an end portion of each of the second stiffness members and an end portion of each of the third strength members are coupled to first and second side surfaces of the rear end portion of each front side member.

8. The vehicle bulkhead structure according to claim 7, wherein a cross-sectional area of the second stiffness members and a cross-sectional area of the third strength members are formed to increase toward a corresponding front side member of the front side members.

9. The vehicle bulkhead structure according to claim 7, wherein a rear extension portion is formed to extend from the rear end portion of each front side member toward a rear of the dash panel.

10. The vehicle bulkhead structure according to claim 6, wherein the first stiffness member and the second stiffness members are made of a same material and have a same thickness.

11. The vehicle bulkhead structure according to claim 6, wherein the first stiffness member and the second stiffness members are made of different materials and have different thicknesses.

12. The vehicle bulkhead structure according to claim 6, further including a pair of first extension portions extending upwardly from the first stiffness member along the dash panel.

13. The vehicle bulkhead structure according to claim 12, where the pair of first extension portions is aligned symmetrical with respect to a center line of the first stiffness member.

14. The vehicle bulkhead structure according to claim 6, further including a dash crossmember coupled to a rear surface of the dash panel.

15. The vehicle bulkhead structure according to claim 14, wherein the dash crossmember is in a shape corresponding to a coupled structure of the first stiffness member, the second stiffness members, and the third strength members.

16. The vehicle bulkhead structure according to claim 15, wherein the dash crossmember includes a curved portion and a pair of second extension portions extending from the curved portion toward the outside of the vehicle.

17. The vehicle bulkhead structure according to claim 16,
    wherein the curved portion has a shape corresponding to a shape of the first stiffness member, and
    wherein each of second extension portions has a shape corresponding to a coupled structure of a corresponding second stiffness member of the second stiffness members and a corresponding third strength member of the third strength members.

\* \* \* \* \*